United States Patent
Miyoshi

(10) Patent No.: US 9,120,582 B2
(45) Date of Patent: Sep. 1, 2015

(54) WARNING SYSTEM OF AIRCRAFT AND AIRCRAFT

(71) Applicant: MITSUBISHI AIRCRAFT CORPORATION, Aichi (JP)

(72) Inventor: Masaya Miyoshi, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 9 days.

(21) Appl. No.: 14/186,137

(22) Filed: Feb. 21, 2014

(65) Prior Publication Data

US 2015/0175273 A1    Jun. 25, 2015

(30) Foreign Application Priority Data

Feb. 28, 2013    (JP) .................................... 2013-39640

(51) Int. Cl.
    G08G 5/00           (2006.01)
    B64D 45/00          (2006.01)
(52) U.S. Cl.
    CPC ................................... B64D 45/0005 (2013.01)
(58) Field of Classification Search
    CPC .............................. B64D 45/0005; B64C 23/06
    USPC ............ 340/963, 945, 686.1, 686.6; 244/194, 244/195, 213, 215
    See application file for complete search history.

(56) References Cited

U.S. PATENT DOCUMENTS

| 6,483,436 | B1 * | 11/2002 | Emaci et al. | ................ | 340/686.1 |
| 6,860,452 | B2 * | 3/2005  | Bacon et al. | .................. | 244/194   |
| 7,338,018 | B2 * | 3/2008  | Huynh et al. | .................. | 244/215   |

FOREIGN PATENT DOCUMENTS

JP          2011-57178 A        3/2011

* cited by examiner

*Primary Examiner* — Tai T Nguyen
(74) *Attorney, Agent, or Firm* — Pearne & Gordon LLP

(57) ABSTRACT

A warning system 10 that warns of saturation of the control capability for the moving surface such as an elevator 4 and a rudder 8 of an aircraft has a determination section 31 that determines whether or not the control capability for the moving surface is saturated, and a display 50 that issues a warning when the determination section 31 determines that the control capability for the moving surface is saturated. The determination section 31 determines that the control capability for the elevator 4 is saturated, when a control target position of the elevator 4 by, for example, a control stick (column) is larger than a first reference position indicating an operation limit of the elevator 4, and a present position of the column is smaller than a second reference position indicating an operation limit of the column.

8 Claims, 3 Drawing Sheets

WARNING SYSTEM OF AIRCRAFT AND AIRCRAFT

BACKGROUND OF THE INVENTION

1. Field of the Invention

The present invention relates to a warning system of an aircraft that notifies a pilot of saturation of control capability of moving surfaces.

2. Description of the Related Art

A pilot needs to recognize the operating states of various systems that are fitted to an aircraft while maneuvering the aircraft, and also needs to recognize the operation limits of these systems in order to perform safe navigation. Therefore, an aircraft includes the function for causing a pilot to recognize the operating states and the operation limits of the systems. For example, a CAS (Crew Alerting System) displays the operating states of various systems, and is known as the system that integrates the functions of a computer automatically monitoring the operating states of various systems, and notifying a pilot of occurrence of an abnormal state visually and audibly. In order to cause a pilot to recognize the degree of urgency, the abnormal state that occurs is divided into three stages of "warning", "caution" and "advisory" in accordance with the degree of urgency thereof.

Further, there is known a system that causes a pilot to notice a sign (a cue) by the sense of touch via a control lever, other than visual and audible means (Japanese Patent Application Laid-Open No. 2011-57178).

SUMMARY OF THE INVENTION

In a maneuvering system of a fly-by-wire method that electrically steers the control surfaces of moving surfaces by converting operations of operation means such as a control stick and a pedal performed by a pilot into electric signals and inputting the electric signals into a hydraulic servo actuator, as the event that should be recognized by the pilot, the event is cited in which the control capability for the moving surfaces (hereinafter, also called "control capability") for steering the aircraft with a pitch axis (Pitch axis), a roll axis (Roll axis) and a yaw axis (Yaw axis) as centers is saturated. This is because in the case of a fly-by-wire method, the operation means and the moving surfaces are not directly connected mechanically, and therefore, even if a pilot does not operate the operation means to the limits, the moving surfaces sometimes reach elevator angle limits (operation limits) while the pilot is unaware of it.

Namely, in general, there are the case in which the control capability for a moving surface is saturated by a pilot steering it, and the case in which the control capability for a moving surface is saturated without involving steering by the pilot. Since in the former case, the pilot intentionally performs saturation to extract the capability of the aircraft, the necessity to notify the pilot that the control capability is saturated especially as an alarm is less. However, since in the case of the latter, the pilot is not aware of the control capability for the moving surface being saturated, there is the possibility that the pilot is incapable of controlling the aircraft stably depending on the following maneuver, and a warning needs to be specially given to the pilot.

Thus, the present invention has an object to provide a warning system that notifies a pilot that control capability for a moving surface is unintentionally saturated.

The present invention is a warning system that warns of saturation of control capability for a moving surface of an aircraft, and has a determination section that determines whether or not the control capability for the moving surface is saturated, and a warning section that issues a warning when the determination section determines that the control capability for the moving surface is saturated, wherein the determination section determines that the control capability for the moving surface is saturated, when a control target position of the moving surface by operation means of the moving surface is larger than a first reference position indicating an operation limit of the moving surface, and a present position of the operation means is smaller than a second reference position indicating an operation limit of the operation means.

In the present invention, the first reference position can be set to be in a vicinity of an operation limit value of the moving surface, and the second reference position can be set to be in a vicinity of an operation limit value of the operation means.

In the present invention, a control stick provided at a cockpit of the aircraft can be applied as the operation means, and as the moving surface, a pair of elevators that are provided at a tail assembly of the aircraft and are operated by the control stick can be applied.

Further, as the operation means, a pedal provided at a cockpit of the aircraft can be applied, and as the moving surface, a rudder that is provided at a vertical tail and is operated by the pedal can be applied.

In the present invention, the determination section can determine that the control capability for the moving surface is not saturated when the control target position is smaller than the first reference position.

Further, in the present invention, even when the present position of the operation means becomes equivalent to the second reference position by an operation of a pilot after the warning section issues a warning, the warning section can continue to issue the warning.

The present invention also provides an aircraft including the warning system described above.

The warning system according to the present invention displays a warning with whether or not steering is intended by a pilot (the second condition) also used as a determination material, namely, issues a warning only in the case of unintentional steering, and therefore, can properly warns the pilot that a moving surface reaches the limit while the pilot is unaware of it. Consequently, according to the invention of the present application, the pilot can be urged to perform stable steering of an aircraft.

DETAILED DESCRIPTION OF THE PREFERRED EMBODIMENTS

Hereinafter, a warning system of the present invention that notifies a pilot that control capability for a moving surface is saturated will be described on the basis of an embodiment.

Figure 1:
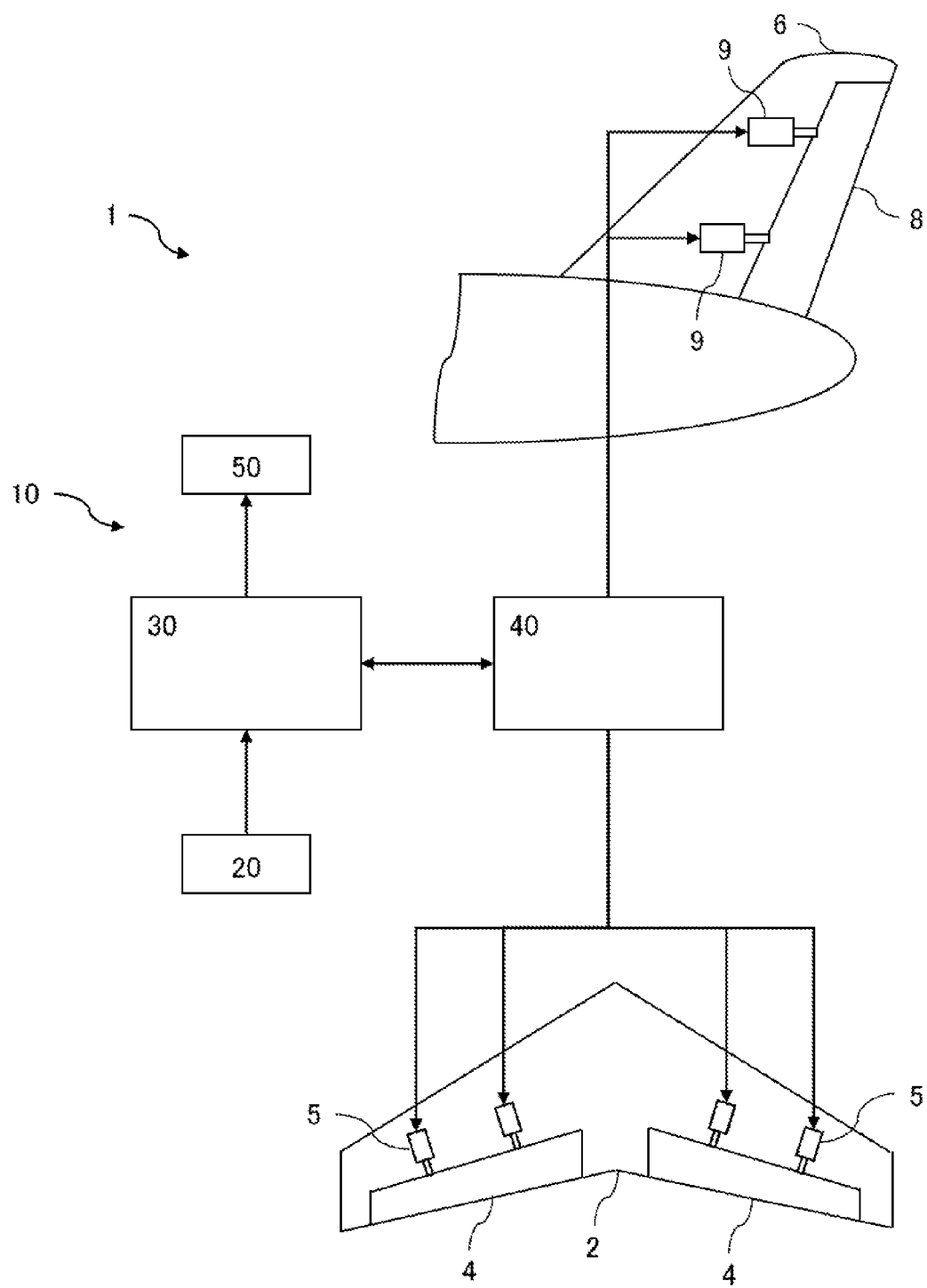
FIG. 1 is a diagram showing a schematic configuration of an aircraft including a control surface saturation warning system according to an embodiment of the present invention.

As shown in FIG. 1, a warning system 10 according to the present embodiment warns a pilot that control capabilities of a pair of left and right elevators 4 and 4 that are provided at a horizontal tail 2 of an aircraft 1, and a rudder 8 that is provided at a vertical tail 6 are saturated.

The elevator 4 is a moving surface that swings by an actuator 5 in a predetermined rudder angle range, and plays a role of oscillating a nose of the aircraft 1 up and down with a pitch axis (not illustrated) as a center. Further, the rudder 8 is a moving surface that swings by an actuator 9 in a predetermined rudder angle range, and plays a role of oscillating the nose of the aircraft 1 to the left and the right with a yaw axis (not illustrated) as a center. Note that the aircraft 1 also includes a moving surface such as an aileron besides them.

The warning system 10 has a pilot controller 20, a flight controller 30, an actuator controller 40 and a display 50.

The pilot controller 20 relates to the elevators 4 and 4, or the rudder 8, and transmits an operation command signal (described later) or the like based on an operation of operation means by the pilot to the flight controller 30 or the actuator controller 40.

The flight controller 30 has functions of issuing various kinds of command information (described later) of the aircraft 1 to the actuator controller 40, and determining whether or not the control capability of the elevators 4 and 4 or the rudder 8 is saturated.

The actuator controller 40 transmits an operation command signal to the actuators 5 and 9 on the basis of the aforementioned operation command signal and various kinds of command information.

The display 50 shows that the control capability of the elevators 4 and 4 or the rudder 8 is saturated on the basis of the determination result of the flight controller 30.

Hereinafter, contents of respective elements will be described with reference to FIG. 2 in addition.

[Operation Means]

In a cockpit of the aircraft 1, two pilot's seats that are a first pilot's seat and a copilot's seat are laterally placed side by side, and each of the pilot's seats is provided with one control stick (not illustrated, and hereinafter called "a column") that collectively operates the pair of elevators 4, and a pair of left and right pedals (not illustrated) that operate the rudder 8 respectively as operation means that operates the elevators 4 and the rudder 8.

The first pilot and the copilot can operate the elevators 4 by operating the columns of the respective pilot's seats that are included at the left and the right. The columns of the respective pilot's seats are respectively operable individually.

Similarly, the pilot can operate the rudder 8 to a left side by the rudder angle corresponding to a depressing amount on a left side pedal, and can operate the rudder 8 to a right side by the rudder angle corresponding to a depressing amount on a right side pedal. Note that the pedals at the respective pilot's seats cannot be individually operated, and, for example, while the first pilot is using the pedal, the co-pilot cannot use the pedal.

The respective columns at the left and the right are respectively provided with column position detecting sensor (not illustrated), and the column position detecting sensor detects a present position of the column relating to an operation of the elevators 4 and 4. Further, as for the pedals, a pedal position detecting sensor (not illustrated) is provided at the pedals at the copilot's seat, and the pedal position detecting sensor detects a present position (a depressed position of the pedal) of the left side pedal or the right side pedal relating to the operation of the rudder 8.

Note that hereinafter, the present position of the column will be also described as "Column Position", and when the present positions of the left and the right columns are described separately, the left and the right columns are described as "L-Column" and "R-Column", respectively. Further, the present positions of the left and the right pedals are collectively described as "Pedal Position" or "Pedal".

[Pilot Controller 20]

The pilot controller 20 acquires the present positions of the respective columns at the left and the right, and the present positions of the pedals from the column position detecting sensors and the pedal position detecting sensor that are described above. The pilot controller 20 transmits the present positions of the respective columns and the pedals that are acquired to the flight controller 30.

Further, the pilot controller 20 generates an operation command signal for operation of the elevator 4, and an operation command signal for operation of the rudder 8 on the basis of operations of the operation means by the pilots, that is, orientations of operations of the respective columns at the left and the right and the pedal and the operation amount. The operation command signals refer to signals that specify target positions to which the elevators 4 and 4 and the rudder 8 are operated and controlled (hereinafter, also called "control target positions"). The pilot controller 20 transmits the generated operation command signals to the flight controller 30 and the actuator controller 40.

Figure 2:
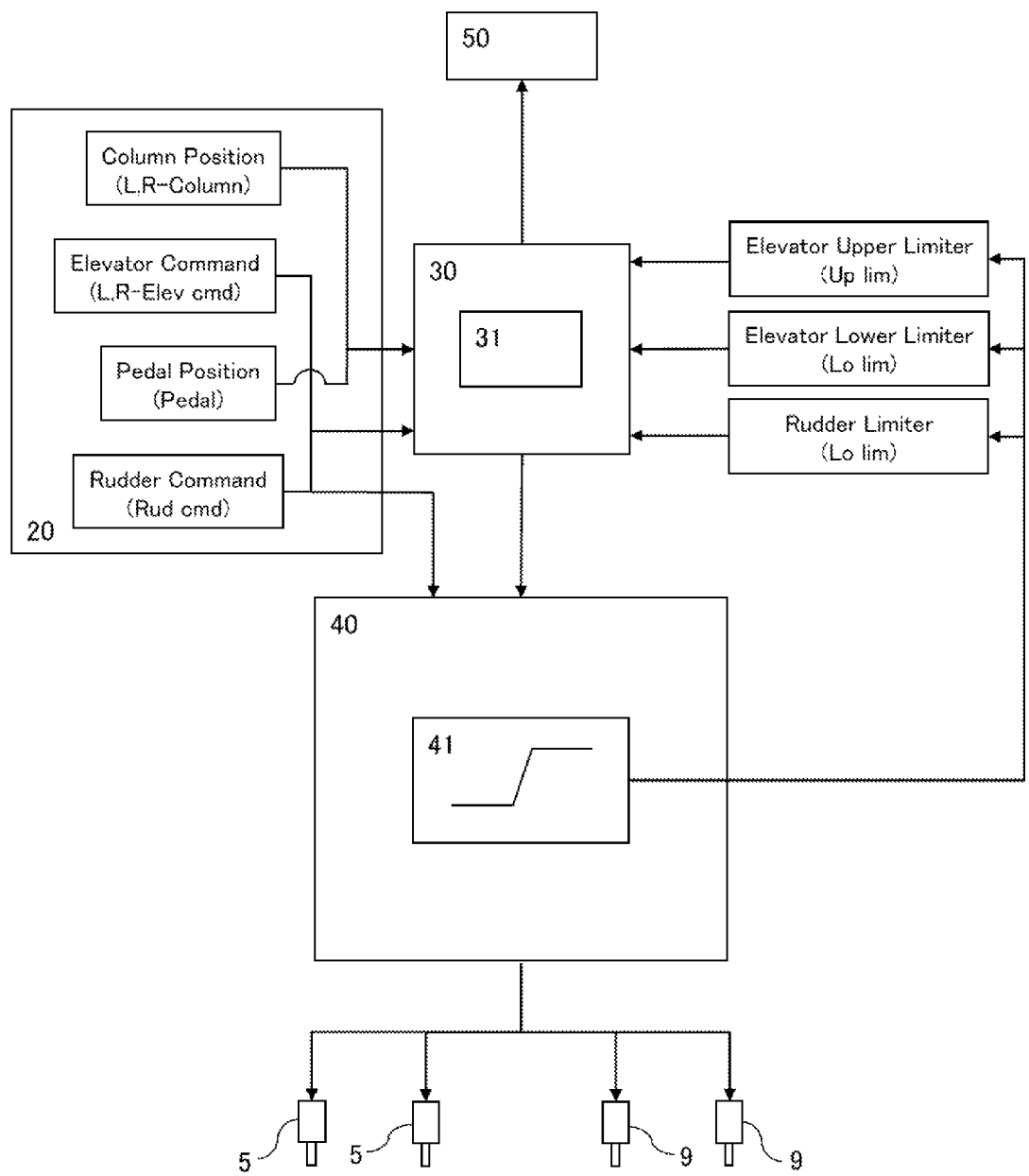
FIG. 2 is a block diagram showing a configuration of the control surface saturation warning system according to the embodiment of the present invention.

Note that hereinafter, the operation command signal of the column to the elevators 4 and 4 will be also described as "Elevator Command", and when the operation command signal is distinguished by being divided into the left and the right columns, the operation command signals are respectively described as "L-Elev cmd" and "R-Elv cmd" (FIG. 2). Further, the operation command signal of the pedal to the rudder 8 is also described as "Pedal Command", or "Rud cmd" (FIG. 2).

[Flight Controller 30]

The flight controller 30 acquires the present positions (Column Position) of the columns at the left and the right, the present position (Pedal Position) of the pedal, and the operation command signals (Elevator Command, Rudder Command) from the pilot controller 20. The flight controller 30 performs determination of whether or not the flight controller 30 gives a warning of saturation of the control capability of the elevators 4 and 4 or the rudder 8 by using the above described acquired information, and limit values (described later) that specify operation limits of the elevator 4 and the rudder 8. The flight controller 30 includes a determination section 31 (described later) to perform the determination.

[Actuator Controller 40]

The actuator controller 40 generates operation command signals for causing the actuators 5 and 9 to perform necessary operations on the basis of the operation command signals (Elevator Command, Rudder Command) that are acquired from the pilot controller 20, and transmits the operation command signals to the actuators 5 and 9. At this time, when numeric values that are specified by the operation command information (Elevator Command and Rudder Command) exceed the limit values specified by a limiter 41, the actuator controller 40 transmits the limit values (specified values) to the actuators 5 and 9 as operation command signals.

The limit value that is specified by the limiter 41 is set for each of Elevator Command and Rudder Command.

As for the limit value to Elevator Command, limit values for the respective upward and downward operation directions (hereinafter, also called "operation limit value" collectively in combination with the limit value for Rudder Command) are respectively set, with a neutral position in the operation range of the elevators 4 and 4 as an original point. For the limit value to the upward direction, a positive numeric value is prescribed, and for the limit value to the downward direction, a negative numeric value is prescribed. Note that hereinafter, the limit values (the operation limit values) to the respective upward and downward directions relating to the elevators 4 and 4 will be also described as "Elevator Upper Limiter" (or "Up lim") and "Elevator Lower Limiter" (or "Lo lim").

Further, as for the limit value (the operation limit value) to Rudder Command, the limit values with respect to the leftward and rightward operation directions are set, with a neutral position in an operation range of the rudder 8 as an original point. In the present embodiment, the limit values to the left and the right are distinguished by a positive and a negative, and absolute values thereof are set as the same value, and the absolute value is set as the limit value. Note that hereinafter, the limit value (the operation limit value) relating to the rudder 8 will be also described as "Rudder Limiter" (or "lim").

For example, when the limit values in the upward and downward directions (Up lim, Lo lim) of the elevators 4 and 4 are set at +10 and −10 respectively, and the operation command signal to the upward direction to the elevators 4 and 4 (L-Elev cmd) by the column at the left side (copilot's seat) is +12, whereas the operation command signal to the downward direction is −15, both the operation command signals exceed the limit values, and therefore, the operation command signals to the actuator 5 are respectively limited to +10 and −10 that are the limit values.

The limit values of the limiter 41 can be set at fixed values, or can be set to be variable. The limit value of the limiter 41 can be made variable by being linked to a navigation speed of the aircraft 1 by the command from the flight controller 30 that detects the navigation speed of the aircraft 1. In this case, as the navigation speed is higher, the limit value (the absolute value) of the limiter 41 is made smaller, whereby breakage of the elevators 4 and 4 and the rudder 8 can be prevented.

Further, here, Elevator Command and Rudder Command are directly subjected to limit processing by the limiter 41, but the Elevator Command and Rudder Command can be subjected to the limiter 41 after being subjected to processing of multiplying the Elevator Command and Rudder Command by gains or the like beforehand.

[Display 50]

The display 50 is provided at a position where the pilots in the cockpit of the aircraft 1 can visually recognize the display 50. The display 50 performs a visual display about the control capability of the elevator 4 or the rudder 8 being saturated, on the basis of the determination result of the flight controller 30 (the determination section 31). Note that another display such as a message based on a navigation state, a navigation environment and a CAS (Crew Alerting System) of the aircraft 1 can be involved. Further, the display 50 also can integrally include a speaker, and can give a warning to the pilot with two kinds of means that are visual and audible.

[Determination Section 31]

Next, on the basis of FIG. 3, the determination section 31 that determines whether or not to give a warning of saturation of the control capability for the elevators 4 and 4 or the rudder 8 will be described.

Figure 3:
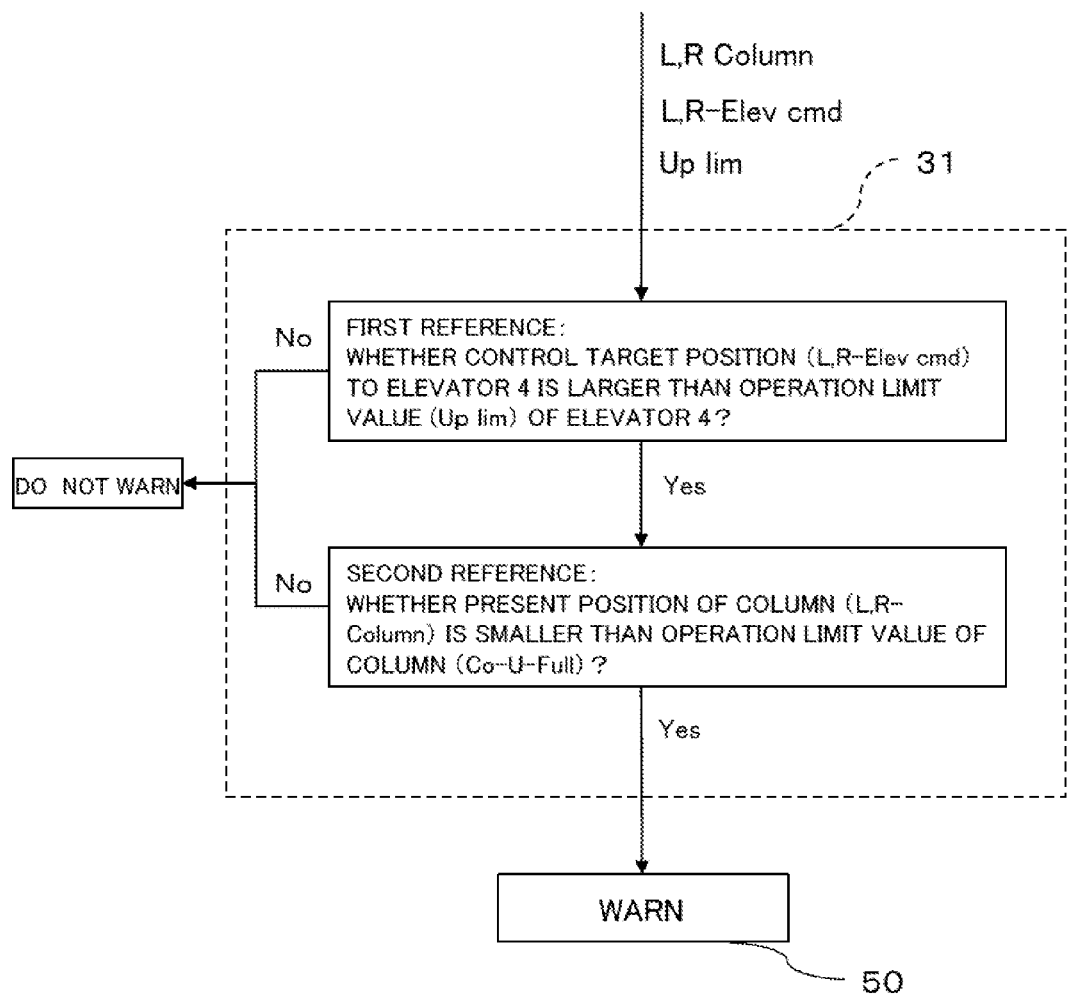
FIG. 3 shows a determination logic of a control surface saturation warning concerning elevators.

FIG. 3 mainly shows the determination section 31 at the time of the elevators 4 and 4 moving in the upward direction (UP) with the neutral position as the original point.

The determination section 31 acquires the present positions (L, R-Column) of the respective columns at the left and the right, the control target positions (L, R-Elev cmd) of the elevators 4 and 4 by the respective columns at the left and the right and the operation limit value (Up lim) relating to the operation limit in the upward direction of the elevators 4 and 4. Further, the determination section 31 stores the operation limit value of the column to the upward direction (Co-U-Full).

First, as a first condition, the determination section 31 determines whether or not the control target positions (L, R-Elev cmd) to the elevator 4 are larger than the operation limit value (Up lim) (a first reference position) with respect to the respective columns at the left and the right. When the first condition is not satisfied with respect to any of the respective columns at the left and the right (when L, R-Elev cmd are Up lim or less), the control capability for the elevator 4 is not saturated, and therefore, a warning is not issued. Meanwhile, when the first condition is satisfied with respect to any one of the columns (when L, or R-Elev cmd is larger than Up lim), a second condition is determined subsequently.

As the second condition, the determination section 31 determines whether or not the present position (L, R-Column) of the column that satisfies the first condition is smaller than the operation limit value (Co-U-Full) (a second reference position) of the column. When the second condition is not satisfied (when L, R-Column is Co-U-Full or more), the control capability for the elevator 4 is saturated by steering intended by the pilot, and therefore, a warning is not issued. Meanwhile, when the second condition is satisfied (when L, R-Column is smaller than Co-U-Full), a warning message is displayed on the display 50.

As above, in the warning system 10 according to the present invention, a warning is displayed by also using whether or not steering is intended by the pilot (the second condition) as a determination basis (a warning is issued only in the case of unintended steering). Therefore, the pilot can be suitably warned of the control surface reaching the elevator angle limit while the pilot is unaware of it, and stable steering of the aircraft can be urged to the pilot.

Note that in the first condition, instead of directly using the operation limit value (Up lim) (the first reference position) relating to the operation limit in the upward direction of the elevator 4 as the object for comparison, comparison with a neighboring value obtained by multiplying the operation limit value by a predetermined coefficient value is preferable. The coefficient value is selected from a range from 0.8 to a value less than 1.0, and is preferably selected from a range from 0.9 to a value less than 1.0. This is for issuing a warning before the control capability for the elevator 4 is completely saturated. Similarly, in the second condition, instead of directly using the operation limit value (Co-U-Full) of the left side column (the second reference position) as the object for comparison, comparing with a neighboring value that is obtained by multiplying the operation limit value by a predetermined coefficient is preferable.

Further, a third condition in which it is determined that the control target positions (L, R-Elev cmd) to the elevator 4 is smaller than the operation limit value (Up lim) with respect to the respective columns at the left and the right is set, and as a coefficient value by which the operation limit value (Up lim) is multiplied, a neighboring value obtained by multiplying by a value different from the first condition (a value slightly smaller the coefficient value of the first condition) is set, and a warning may be configured not to be issued as long as the third condition is satisfied.

Further, when the present position of the column becomes equivalent to the operation limit value (the second reference position) thereof by an operation of the pilot, after the display 50 temporarily displays a warning message (the control capability is saturated by unintentional steering of the pilot), the second condition is not satisfied, but the warning message continues to be issued on the display 50. This is for continuously urging the pilot to perform stable steering.

Further, the determination sequence of the first condition and the second condition may be opposite from the above description. Namely, the second condition is determined first, and thereafter, only when the second condition is satisfied, the first condition may be determined.

Further, as for a display of the display 50, which of the left side column and the right side column causes a warning also can be displayed in combination. This is because the pilot easily reflects it on the following maneuvering.

Further, the example at the time of the elevators 4 and 4 operating in the upward direction with the neutral position as the original point is described above, but when the elevator 4 operates in the downward direction (DOWN), the determination section 31 executes determination logic similar to the operation in the upward direction.

Further, with respect to the rudder 8, determination logic similar to the case of the elevator 4 (FIG. 3) is executed.

The embodiment of the present invention is described above, and it is possible to select the configurations cited in the above described embodiment, and change the configurations properly to other configurations, as long as it does not depart from the scope of the present invention.

For example, determination is made about the control capability for the aircraft with the respective axes that are the pitch axis (the elevator 4) and the yaw axis (the rudder 8) as the centers, but the present invention can be applied to the case of making determination of the control capability of any one of them. Further, the control capability about the roll axis by using the moving surface such as an aileron that is provided at a main wing also can be made the object of determination.

What is claimed is:

1. A warning system of an aircraft that warns of saturation of control capability for a moving surface of an aircraft, including
a determination section that determines whether or not the control capability for the moving surface is saturated; and
a warning section that issues a warning when the determination section determines that the control capability for the moving surface is saturated,
wherein the determination section is configured to determine that the control capability for the moving surface is saturated,
when a control target position of the moving surface by operation means of the moving surface is larger than a first reference position indicating an operation limit of the moving surface, and
a present position of the operation means is smaller than a second reference position indicating an operation limit of the operation means.

2. The warning system of an aircraft according to claim 1, wherein the first reference position is in a vicinity of an operation limit value of the moving surface.

3. The warning system of an aircraft according to claim 1, wherein the second reference position is in a vicinity of an operation limit value of the operation means.

4. The warning system of an aircraft according to claim 1, wherein the operation means is a control stick provided at a cockpit of the aircraft, and
the moving surface is a pair of elevators that are provided at a tail assembly of the aircraft and are operated by the control stick.

5. The warning system of an aircraft according to claim 1, wherein the operation means is a pedal provided at a cockpit of the aircraft, and
the moving surface is a rudder that is provided at a vertical tail, and is operated by the pedal.

6. The warning system of an aircraft according to claim 1, wherein the determination section is configured to determine that the control capability for the moving surface is not saturated, when the control target position is smaller than the first reference position.

7. The warning system of an aircraft according to claim 1, wherein even when the present position of the operation means becomes equivalent to the second reference position by an operation of a pilot after the warning section issues a warning, the warning section is configured to continue to issue the warning.

8. An aircraft, comprising the warning system of an aircraft according to claim 1.

* * * * *